United States Patent [19]

Sasaki

[11] Patent Number: 4,714,964
[45] Date of Patent: Dec. 22, 1987

[54] INTERMEDIATE GRADIENT IMAGE FORMING METHOD

[75] Inventor: Takashi Sasaki, Tokyo, Japan

[73] Assignee: Canon Kabushiki Kaisha, Tokyo, Japan

[21] Appl. No.: 946,098

[22] Filed: Dec. 23, 1986

Related U.S. Application Data

[63] Continuation of Ser. No. 752,532, Jul. 8, 1985, abandoned.

[30] Foreign Application Priority Data

Jul. 13, 1984 [JP] Japan ............................ 59-146207

[51] Int. Cl.$^4$ ..................... H04N 1/23; G01D 15/16
[52] U.S. Cl. .................................. 358/298; 346/1.1; 346/140 R
[58] Field of Search ................... 346/140, 1.1, 75; 358/75, 78, 283, 289

[56] References Cited

U.S. PATENT DOCUMENTS

| | | |
|---|---|---|
| Re. 27,555 | 1/1973 | Loughren . |
| 1,656,338 | 1/1928 | Ranger . |
| 1,790,723 | 2/1931 | Ranger . |
| 1,817,098 | 8/1931 | Ranger . |
| 3,197,558 | 7/1965 | Ernst . |
| 3,404,221 | 10/1968 | Loughren . |
| 3,681,650 | 8/1972 | Koll . |
| 3,683,212 | 8/1972 | Zoltan . |
| 3,739,084 | 6/1973 | Heinrich . |
| 3,747,120 | 7/1973 | Stemme . |
| 3,864,696 | 2/1975 | Fischbeck . |
| 3,961,306 | 6/1976 | Anstey . |
| 3,977,007 | 8/1976 | Berry et al. . |
| 4,050,077 | 9/1977 | Yamada et al. . |
| 4,108,654 | 8/1975 | Goren . |
| 4,178,597 | 12/1979 | Isayama et al. . |
| 4,272,771 | 6/1981 | Furukawa . |
| 4,300,142 | 11/1981 | Kos . |
| 4,313,684 | 2/1982 | Tazaki et al. . |
| 4,314,274 | 2/1982 | Atoji et al. . |
| 4,339,774 | 7/1982 | Temple . |
| 4,342,051 | 7/1982 | Suzuki et al. . |
| 4,353,079 | 10/1982 | Kawanabe . |
| 4,365,275 | 12/1982 | Berman et al. . |
| 4,368,491 | 1/1983 | Saito . |
| 4,386,272 | 5/1983 | Check, Jr. et al. . |
| 4,389,712 | 6/1983 | Frattarola et al. . |
| 4,394,662 | 7/1983 | Yoshida et al. . |
| 4,394,693 | 7/1983 | Shirley . |
| 4,403,874 | 9/1983 | Payne et al. . |
| 4,412,225 | 10/1983 | Yoshida et al. . |
| 4,412,226 | 10/1983 | Yoshida et al. . |
| 4,413,275 | 11/1983 | Horiuchi et al. . |
| 4,414,635 | 11/1983 | Gast et al. . |
| 4,431,319 | 2/1984 | Karaki et al. . |

(List continued on next page.)

FOREIGN PATENT DOCUMENTS

| | | |
|---|---|---|
| 52-11712 | 1/1977 | Japan . |
| 53-102034 | 9/1978 | Japan . |
| 57-156264 | 9/1982 | Japan . |
| 58-60878 | 1/1983 | Japan . |
| 58-212970 | 10/1983 | Japan . |
| 59-52658 | 3/1984 | Japan . |
| 59-41969 | 8/1984 | Japan . |

OTHER PUBLICATIONS

Skinner et al.; Digital Color Printer, IBM Tech. Disc. Bulletin, vol. 21, No. 5, Oct. 1978, pp. 1828–1829.

Primary Examiner—Joseph W. Hartary
Attorney, Agent, or Firm—Fitzpatrick, Cella, Harper & Scinto

[57] ABSTRACT

An image forming technique uses dots having at least two or more kinds of sizes are formed with respect to each of two kinds of coloring agents having different coloring concentrations, the optical density of the minimum dot of the coloring agent having a high coloring concentration is set to be smaller than the optical density of the maximum dot of the coloring agent having a low coloring concentration. It is possible to realize a gradient expression such that no pseudo outline due to the difference in dot concentration is generated even if there is a sudden density change.

8 Claims, 8 Drawing Figures

U.S. PATENT DOCUMENTS

| | | |
|---|---|---|
| 4,438,453 | 3/1984 | Alston . |
| 4,446,470 | 5/1984 | Sugiyama et al. . |
| 4,468,706 | 8/1984 | Cahill . |
| 4,488,245 | 12/1984 | Dalke et al. . |
| 4,492,965 | 1/1985 | Ohnishi et al. . |
| 4,494,128 | 1/1985 | Vaught . |
| 4,499,479 | 2/1985 | Lee et al. . |
| 4,533,920 | 8/1985 | Suzuki . |
| 4,533,923 | 8/1985 | Suzuki ................... 346/1.1 |
| 4,533,928 | 8/1985 | Sugiura et al. . |
| 4,547,812 | 10/1985 | Waller et al. . |
| 4,549,222 | 10/1985 | Fogaroli et al. . |
| 4,559,542 | 12/1985 | Mita . |
| 4,560,997 | 12/1985 | Sato ...................... 346/140 |
| 4,580,150 | 4/1986 | Tazaki . |
| 4,595,948 | 6/1986 | Itoh et al. . |
| 4,604,654 | 8/1986 | Sakurada ............... 358/298 |
| 4,631,578 | 12/1986 | Sasaki et al. . |
| 4,635,078 | 1/1987 | Sakurada et al. . |

FIG. 4

| DOT DIAMETER | LARGE | SMALL |
|---|---|---|
| OD OF LOW-CONCENTRATION INK | 0.64(L3) | 0.16(L1) |
| OD OF HIGH-CONCENTRATION INK | 1.28(L4) | 0.32(L2) |
| DRIVING VOLTAGE | 100V | 20V |

FIG. 5A

| 0.72 | 1.04 |
|---|---|
| 1.20 | 0.88 |

| 0.36 | 0.32 |
|---|---|
| 0.60 | 0.44 |

| 0.18 | 0.26 |
|---|---|
| 0.30 | 0.22 |

| 0.02 | 0.10 |
|---|---|
| 0.14 | 0.06 |

M0

INTERMEDIATE GRADIENT IMAGE FORMING METHOD

This application is a continuation of application Ser. No. 752,532 filed July 8, 1985, now abandoned.

BACKGROUND OF THE INVENTION

1. Field of the Invention

The present invention relates to an intermediate gradient image forming method whereby gradients are expressed using dots of a coloring agent.

2. Description of the Prior Art

Hitherto, as a method for such a kind of gradient expression, in general, there is a density modulating method such as a dither method, a density patterning method or the like whereby densities of constant dots are controlled in accordance with light and shade of an image.

However, in case of obtaining smoother gradients by these methods, there are problems such that the size of a dither matrix has to be set to be large and in the density patterning method, the number of submatrices which are derived by dividing the dither matrix has to be made large, so that the effective pixel size is enlarged and resolution deteriorates.

For such problems, for example, as set forth in the Japanese Patent Unexamined Publication No. 60878/1983, there has been proposed a method whereby the number of kinds of dots which are used is set to a plural number by making dot diameters, ink concentrations or the like different and what is called a multi-value conversion is performed, thereby deriving a picture quality having excellent gradient and resolution.

An explanation will be made hereinbelow with respect to an example of an ink jet printer.

FIG. 1 shows an example whereby each of the dot diameter and ink concentration is made different to obtain two different kinds of values, and the multivalue conversion of total five values consisting of printing (1) no dot, (2) a small dot of low-concentration ink, (3) a large dot of low-concentration ink, (4) a small dot of high-concentration ink, and (5) a large dot of high-concentration ink, and then these five values are density modulated by way of a matrix of $2 \times 2$.

In this way, a total of seventeen gradients can be expressed. However, in this case, the concentrations of the inks which are used in the eighth and twelfth gradients differ. Namely, the ink concentration is switched from the low-concentration ink to the high-concentration ink on a four-stage unit basis. Therefore, when the density suddenly changes, a pseudo outline is generated in that change portion due to the difference in ink concentration, so that picture quality deteriorates.

SUMMARY OF THE INVENTION

It is an object of the present invention to provide an intermediate gradient image forming method in which no pseudo outline is generated even in the case where the multi-value conversion is performed using coloring agents having different concentration in consideration of the foregoing points.

It is a specific object of the invention to provide an intermediate gradient image forming method in which in the case where an intermediate gradient image is formed using a density modulation, the reflection optical density of the minimum dot of the coloring agent having a high coloring concentration is made smaller than that of the maximum dot of the coloring agent having a low coloring concentration Other objects and features of the present invention will be more apparent from the following detailed description in conjunction with the accompanying drawings.

BRIEF DESCRIPTION OF THE DRAWINGS

FIG. 4 is a diagram showing the relation between the OD value of each dot and the driving voltage; and FIGS. 5A to 5D are diagrams showing dither patterns.

DESCRIPTION OF THE PREFERRED EMBODIMENT

Figure 1:
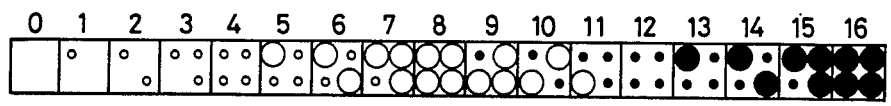
FIG. 1 is is an explanatory diagram of a conventional gradient expression.
Figure 2:
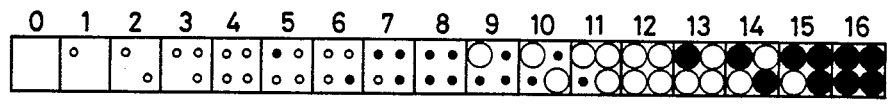
FIG. 2 is an explanatory diagram of a gradient expression in an embodiment of the present invention.

FIG. 2 shows an example of a gradient expression according to the present invention. When the minimum dot of a high-concentration ink is formed at a predetermined density, the reflection optical density (hereinafter, referred to as an OD value) is set to be smaller than the OD value of the maximum dot of a low-concentration ink. Therefore, seven stages from the fifth to eleventh gradients are included in a range where the ink changes from the low-concentration ink to the high-concentration ink.

Thus, even in the case where the density change suddenly occurs, a smooth image without a pseudo outline is derived.

Figure 3:
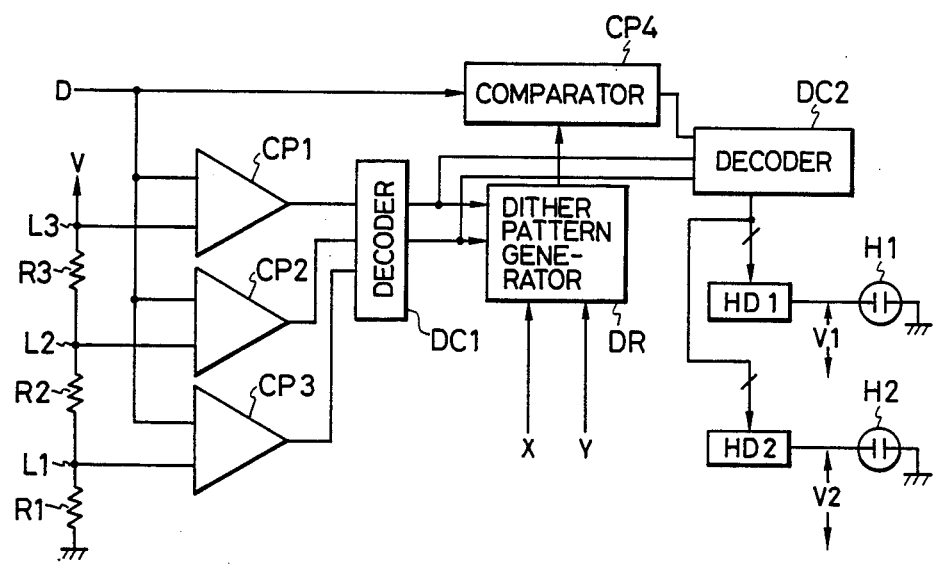
FIG. 3 is a diagram of a signal processing circuit of an ink jet printer in an embodiment of the invention.

FIG. 3 is a diagram showing a signal processing circuit of an ink jet printer of an embodiment of the present invention.

In FIG. 3, $CP_1$ to $CP_3$ denote comparators for comparing a density D of the pixel to be processed with reference voltages $L_1$, $L_2$ and $L_3$, respectively; $DC_1$ denotes a decoder for discriminating the density D to see if (1) $L_3 < D$, (2) $L_2 < D < L_3$, (3) $L_1 < D < L_2$, and (4) $D < L_1$; DR denotes a dither pattern generator in which four dither matrices shown in FIGS. 5A to 5D are stored; $CP_4$ denotes a comparator for comparing an output of the dither pattern generator DR with the density D; $DC_2$ denotes a decoder for controlling ink jet head drive circuits $HD_1$ and $HD_2$ on the basis of an output of the comparator $CP_4$ and an output of the decoder $DC_1$; $H_1$ denotes an ink jet head for discharging a high-concentration ink; and $H_2$ denotes an ink jet head for discharging a low-concentration ink. In both of the heads $H_1$ and $H_2$, the dot diameters are changed in dependence on respective driving voltages $V_1$ and $V_2$ shown in FIG. 4.

The operation of the circuit of FIG. 3 will then be explained.

(1) When it is determined that $D > L_3$ by the decoder $DC_1$, a matrix $M_3$ of FIG. 5A is selected. If $$D_{TH} = M_3(\text{mod}_2 X, \text{mod}_2 Y)$$

$$D \geq D_{TH}$$

the driving voltage $V_1$ of the head $H_1$ becomes 100 V and a large high-density dot is formed and the head $H_2$ is not driven. When $D < D_{TH}$, the head $H_1$ is not driven and the driving voltage $V_2$ of the head $H_2$ becomes 100 V, so that a large low-density dot is formed.

Hereinbelow, a control is made in the following manner.

(2) When $L_3 > D > L_2$, assuming that $D_{TH} = M_2$ $(\text{mod}_2 X, \text{mod}_2 Y)$,
  if $D \geq D_{TH}$, $V_2 = 0$ V and $V_1 = 100$ V
  if $D < D_{TH}$, $V_2 = 20$ V and $V_1 = 0$ V (3) When $L_2 > D > L_1$, assuming that $D_{TH} = M_1$ $(\text{mod}_2 X, \text{mod}_2 Y)$,
  if $D \geq D_{TH}$, $V_2 = 20$ V and $V_1 = 0$ V
  if $D < D_{TH}$, $V_2 = 0$ V and $V_1 = 20$ V (4) When $L_1 > D$, assuming that $D_{TH} = M_0$ $(\text{mod}_2 X, \text{mod}_2 Y)$,
  if $D \geq D_{TH}$, $V_2 = 0$ V and $V_1 = 20$ V
  if $D < D_{TH}$, $V_2 = 0$ V and $V_1 = 0$ V In general, in case of using a matrix of $2 \times 2$, when $P > D > Q$, a dither matrix A is set such that $$a_{11} = Q + \tfrac{1}{5}(P-Q)$$

$$a_{22} = Q + \tfrac{3}{5}(P-Q)$$

$$a_{12} = Q + \tfrac{5}{5}(P-Q)$$

$$a_{13} = Q + \tfrac{7}{5}(P-Q)$$

and similar processes may be performed.

The case where there are two kinds of ink concentrations and two kinds of dot diameters has been described in the above. However, the present invention can be also similarly applied to other cases where there are multi-values of three or more values with respect to each of the ink concentration and dot diameter. Other matrices than $2 \times 2$ may be also used as a dither matrix. In addition, by applying the foregoing embodiment to cyan, magenta, yellow, and black, preferable color intermediate gradients can be also obtained. Further, although a dither method has been used as a density modulating method to control ratios of appearance of dots per unit area, a density patterning method can be also used.

As described above, according to the present invention, when a gradient expression is performed using coloring agents having different concentrations, even if there is a sudden density change, it is possible to prevent the generation of the pseudo outline caused due to the density difference of dots, and an image of a high picture quality is derived.

Although the ink jet printer has been explained as an example in the foregoing embodiment, the invention can be applied to various kind of printers such as a thermal transfer type printer, an electrophotographic printer or the like.

The present invention is not limited to the foregoing embodiment but many modifications and variations are possible within the spirit and scope of the appended claims of the invention.

What I claim is:

1. A method of reproducing an original image by providing a half-tone image with an optical reflection density range substantially the same as that of the original image, utilizing dots the optical reflection density of which is modulated in accordance with a predetermined modulation technique, the method comprising the steps of:

providing coloring agents having at least two different concentrations;

forming dots on a recording surface using the coloring agents, wherein dots of at least two sizes can be used for each coloring agent, the optical reflection density of the maximun-size dots formed using the minmum-concentration coloring agent being higher than the optical reflection density of the minimum-size dots formed using the maximum-concentration coloring agent;

locating the dots on the recording surface in a matrix which represents an element of the picture and has a plurality of elementary areas, each of which is available for the formation of dots therein; and selecting for each elementary area one of (a) no dot, (b) the minimum-size dot of the minimum-concentration coloring agent, (c) the minimum-size dot of the maximum-concentration coloring agent, (d) the maximum-size dot of the minimum-concentration coloring agent and (e) the maximum-size dot of the maximum-concentration coloring agent, in the named order in response to increasing optical reflection density of the image, wherein the selection is performed by comparing the optical reflection density level of the image with a reference level that is varied from one elementary area to another.

2. A method according to claim 1, wherein a dither technique is used for density modulation.

3. A method according to claim 1, wherein each coloring agent is an ink having a different concentration.

4. A method according to claim 3, wherein the dots are formed using different ink jet heads, which eject droplets of ink upon the application of energy thereto, for the respective inks of different concentrations and the dot sizes are varied by changing the amount of energy applied to the ink jet heads.

5. Apparatus for reproducing an original image by providing a half-tone image with an optical reflection density range substantially the same as that of the original image, utilizing dots the optical reflection density of which is modulated in accordance with a predetermined modulation technique, the apparatus comprising:

first dot-forming means for forming variable-size dots on a recording surface using a coloring agent having a first concentration;

second dot-forming means for forming variable-size dots on the recording surface using a coloring agent having a second concentration lower than the first concentration, wherein the optical reflection density of the maximum-size dots formed using the lower-concentration coloring agent is higher than the optical reflection density of the minimum-size dots formed using the higher-concentration coloring agent; and selecting means for selecting between said dot-forming means for each of a plurality of elementary areas in a matrix which represents an element of the picture, such that there is formed in each elementary area one of (a) no dot, (b) the medimum-size dot formable by said second dot-forming means, (c) the minimum-size dot formable by said first dot-forming means, (d) the maximum-size dot formable by said seocnd dot-forming means and (e) the maximum-size dot formable by said first dot-forming means, in the named order in response to increasing optical reflection density of the image, wherein said selection means performs said selection by comparing the optical reflection density level of the image with a reference level that is varied from one elementary area to another.

6. Apparatus according to claim 5, wherein said first and second dot-forming means include ink jet heads for ejecting ink of different concentrations.

7. Apparatus according to claim 5, wherein said selecting means includes a dither pattern generator that modulates the optical reflection density of the dots in response to a dither pattern.

8. Apparatus according to claim 7, wherein said dither pattern generator provides a dither pattern for each kind of dot.

* * * * *

UNITED STATES PATENT AND TRADEMARK OFFICE
CERTIFICATE OF CORRECTION

PATENT NO. : 4,714,964
DATED : December 22, 1987
INVENTOR(S) : TAKASHI SASAKI

It is certified that error appears in the above-identified patent and that said Letters Patent is hereby corrected as shown below:

AT [56] IN THE REFERENCES

"4,108,654   8/1975   Goren ." should read
--4,108,654   8/1978   Goren .--.

AT [57] IN THE ABSTRACT

Line 2, "are" should be deleted.

COLUMN 3

Line 9, "$D_{TH}=M1$" should read --$D_{TH}=M_1$--.

COLUMN 4

Line 4, "maximun-size" should read --maximum-size--.
Line 5, "minmum-concentration" should read
    --minimum-concentration--.
Line 59, "medimum-size" should read --minimum-size--.
Line 63, "seocnd" should read --second--.

Signed and Sealed this

Sixteenth Day of August, 1988

Attest:

DONALD J. QUIGG

*Attesting Officer*         *Commissioner of Patents and Trademarks*